US005978786A

United States Patent [19]
Eyles

[11] Patent Number: 5,978,786
[45] Date of Patent: Nov. 2, 1999

[54] SYSTEM AND METHOD FOR AUTOMATICALLY EXECUTING DECISIONAL RULES

[75] Inventor: Donald Eyles, Boston, Mass.

[73] Assignee: The Charles Stark Draper Laboratory, Inc., Cambridge, Mass.

[21] Appl. No.: 08/943,742

[22] Filed: Oct. 3, 1997

Related U.S. Application Data

[63] Continuation of application No. 08/786,048, Jan. 21, 1997, abandoned, which is a continuation of application No. 08/366,009, Dec. 29, 1994, abandoned, which is a continuation of application No. 07/891,934, May 29, 1992, abandoned.

[51] Int. Cl.[6] .................................................. G06F 15/18
[52] U.S. Cl. ............................................. 706/58; 706/46
[58] Field of Search .......................... 395/51, 62; 706/53, 706/58, 46, 903

[56] References Cited

U.S. PATENT DOCUMENTS

| 5,175,795 | 12/1992 | Tsuda et al. | 706/53 |
| 5,283,856 | 2/1994 | Gross et al. | 706/47 |

OTHER PUBLICATIONS

Prevost et al., "Knowledge–Based Diagnosis of Electronic Instruction", pp 42–48, 1985 IEEE.

Read et al., "Complex System Monitoring and Fault Diagnosis Using Communicating Expert Systems", pp. 102–109, 1986 IEEE.

Laffey, Thomas J., "Reasoning About Fault Diagnosis with LES", pp. 13–20, 1986 IEEE Expert.

J.F. Allen, "Towards a General Theory of Action and Time," *Artificial Intelligence*, vol. 23 (1984), pp. 123–154.

J. Mylopoulos et al., "Knowbel: A Hybrid Expert System Building Tool," 1990 *Int'l. Workshop on Tools for Artifical Intelligence* (Nov. 1990), pp. 864–870.

G. Grelinger and P. Morizet–Mahoudeaux, "A Fully Integrated Real–Time Multi–Tasking Knowledge–Based System . . . ," 1992 *Conf. AI Appl's.* (Mar. 1992), pp. 310–316.

K. Pedersen, Expert Systems Programming: practical techniques for rule–based systems, John Wiley & Sons, pp. 40–53, Dec. 1989.

Adding Temporal Reasoning to Expert–System–Building Environments; Perkins et al; IEEE Expert; Feb. 1990; pp. 23–30.

*Primary Examiner*—Robert W. Downs
*Attorney, Agent, or Firm*—Iandiorio & Teska

[57] ABSTRACT

A system and method for automatically evaluating a decisional rule containing a task and a condition which must be fulfilled before the task can be performed and for automatically performing the task when or whenever the condition is fulfilled in which a decisional rule is entered into computing means, parsed, and then processed such that automatic and continuing iterative evaluations of whether the condition is fulfilled are provided until the condition is fulfilled and then the task associated with the decisional rule is automatically performed and whereby further processing is resumed only after the condition is fulfilled.

25 Claims, 12 Drawing Sheets

SYSTEM AND METHOD FOR AUTOMATICALLY EXECUTING DECISIONAL RULES

This is a continuation of application Ser. No. 08/786,048, filed Jan. 21, 1997, now abandoned, which is a continuation of Ser. No. 08/366,009 filed Dec. 29, 1994, now abandoned which is continuation of application Ser. No. 07/891,934, filed May 29, 1992, now abandoned.

FIELD OF INVENTION

A method and system for automatically evaluating decisional rules containing tasks and conditions which must be fulfilled before the tasks can be performed wherein continuing iterative evaluations of whether the conditions are fulfilled are automatically performed and processing is resumed only after the conditions are fulfilled.

BACKGROUND OF INVENTION

Conventional computer-based systems generally have the capacity to quickly process many decisional rules of the type "IF [condition], then [perform task]." As processing occurs and the decisional rule is executed, if the condition is fulfilled, the task will be performed.

IF type logic statements, in fact, could fairly be called fundamental constructs in computer science-based technology and IF statements are standard language descriptors shared by most high level computer languages including Ada, Algol, BASIC, C, LISP, FORTRAN; and even software command languages such as dBASE III and SuperCalc. A system which has the ability to perform tasks based on the fulfillment of one or more conditions following an IF statement as that statement is executed is satisfactory for many applications.

Unfortunately, such systems do not include means to automatically evaluate whether the condition are fulfilled unless the decisional rule containing the IF command is itself currently being executed. Furthermore, sequential evaluation of the decisional rules is not automatic. Processing starts, the decisional rule is executed once, and processing then continues. To recursively evaluate the condition of the decisional rule, the decisional rule itself must be recursively executed. To accomplish this, computer programmers skilled in the art must program the system appropriately using "loops" so that recursive execution of the decisional rule occurs.

In many applications, however, such as in systems on board the space shuttle or space station, the astronaut or ground crew operators of such systems may not be sufficiently skilled in computer science disciplines to program the system to meet their needs. Furthermore, such programming is time consuming, cumbersome and complex in systems involving many decisional rules, subject to errors, and not ergonomically sound. In addition, such programming requires continuous execution in programming "loops" containing the decisional rules.

Most importantly, human beings think not in terms of recursive repetition of decisions whether to perform a given task; instead, they base their actions on when in time it would be appropriate to perform the task. The process of translating human thought into an abstract series of steps that could implement that thought has been the focus (and the success) of computer-based systems and artificial intelligence. The invention of high level programming languages was a major achievement in the development of a system which emulates not machine thinking, but human thinking.

Recursive based evaluations of decisional rules, common in programming using high level languages, however, still emulate machine thinking. For example, imagine a given task is: at 30 seconds before launch, ignition of the shuttle rocket engine is to occur. This decision rule would look something like: "IF $T=T_{launch}-30$, then ignite rocket engine."

Prior art systems would execute the rule and in doing so, check once whether $T=T_{launch}-30$ is true. If this condition is not true, execution ends. This prior art system could be forced to recursively execute this decisional rule until $T=T_{launch}-30$ is true, (and then ignite the rocket engine), but the skill required to achieve this result, as explained above, is not elementary.

Since human beings have the capacity to easily function within the flow of time, a better system, and a system which more closely emulates human thinking, would automatically receive and process decisional rules based on the flow of time. The form of such a decisional rule might be: "When $T=T_{launch}-30$, then ignite engine." Unfortunately, no such system exists. As delineated above, the same result may be achieved, more or less, by individually designing the IF-based decisional rules of prior art systems, but achieving that result requires specialized training, and an often complicated design. Astronauts and others who often use such systems often lack specialized training, and moreover do not have sufficient time (while operating other systems on board a space craft) to engage in such design efforts.

Accordingly, there is a need for a system based on emulating human thinking and which therefore functions within the flow of time.

SUMMARY OF INVENTION

It is therefore an object of this invention to provide a system and method for executing a decisional rule which performs a task upon the fulfillment of a condition which provides automatic and continuing iterative evaluations of whether the condition is fulfilled until the condition is fulfilled at least once and which resumes any further processing only after the condition is fulfilled once.

It is a further object of this invention to provide such a system and method which does not require manual programming of the system in order to achieve continuing recursive evaluation of conditions contained within a decisional rule.

It is a further object of this invention to provide such a system and method which operates within the flow of time.

It is a further object of this invention to provide such a system and method which allows as input constructs which more closely emulates human thinking thereby providing a sound ergonomic design.

It is a further object of this invention to provide such a system and method which automatically and iteratively evaluates whether the conditions of a decisional rule are fulfilled, thereby alleviating the need for manually providing additional decisional rules which force sequential evaluation in programming "loops."

This invention results from the realization that a system and method for automatically executing decisional rules which perform tasks upon the fulfillment of conditions can be accomplished by automatically providing continuing iterative evaluations of whether the conditions are fulfilled until the conditions are fulfilled at least once and by allowing processing to resume only after the conditions are fulfilled at least once thereby permitting decisional rules to be in a form which more closely emulates human thinking and thereby also eliminating the need to manually force recursive execution of the decisional rules which would otherwise require knowledge of computer science disciplines and complex logic structures.

This invention feature a method for automatically evaluating a decisional rule containing a task and a condition which must be fulfilled before the task can be performed and for automatically performing the task when the condition is fulfilled. The method involves providing automatic and continuing iterative evaluations of whether the condition is fulfilled until the condition of the decisional rule is fulfilled. Then and only then is further processing allowed. Accordingly, the decisional rule is entered into computing means and compiled to parse and isolate the condition. In one embodiment automatic and continuing iterative evaluations are provided of whether the condition is fulfilled until the condition is fulfilled once, the task is then automatically performed when the condition is fulfilled once and further processing is resumed only after the condition is fulfilled once. In another embodiment, automatic and iterative evaluations of whether the condition is fulfilled are provided and the task is automatically performed whenever the condition is fulfilled. Further processing is resumed each time the condition is fulfilled. In still another embodiment the condition contains a time period which must be satisfied before the task can be performed. In that embodiment the task is performed automatically each time the time period is satisfied and processing is resumed each time the task is performed. This invention also features a method for automatically executing a decisional rule containing a task and a condition which must be fulfilled before the task can be performed and for automatically performing the task whenever the condition is fulfilled in which the decisional rule is entered into computing means and compiled to parse the condition. Automatic and continuing iterative evaluations are provided of whether the condition is fulfilled and a determination is made whether the status of the condition has changed from between each iterative evaluation. Only if both the condition is fulfilled and the status has changed is the task automatically performed and does processing resume. This invention also features a system for automatically evaluating a decisional rule containing a task and a condition which must be fulfilled before the task can be performed and automatically performing the task when the condition is fulfilled. There are computing means including compiler means and executor means responsive to the compiler means. There are also means to enter one or more decisional rules containing a condition and a task to be performed when the condition is fulfilled into the computing means such as a keyboard coupled with a computer containing a microprocessor. The compiler means includes parsing means for isolating the condition and also includes means for determining whether evaluations of the condition are to continue after the condition is fulfilled the first time. The executor means includes means to provide automatic and continuing iterative evaluations of whether the condition is fulfilled and also includes means to perform the task when the condition is fulfilled. Furthermore, the executor means may include means for performing the task whenever the condition is fulfilled. There may also be means to assess, for each iterative evaluation of the condition, whether the condition has changed from a status of fulfilled to not fulfilled and in that embodiment the executor performs the task only when both the condition is fulfilled and the condition has changed from iteration to the next.

This invention also features a method for automatically evaluating a decisional rule containing a task and a condition which must be fulfilled before the task can be performed and for automatically performing the task when the condition is fulfilled in which bundles made up of sequences of statements including decisional rules are entered into the computing means. Each decisional rule is compiled to parse the condition associated with each decisional rule to determine for each decisional rule whether evaluations of the decisional rule are to continue after the condition associated with each is fulfilled once. Automatic and continuing iterative evaluations are provided whether the condition is fulfilled. Each bundle may be processed in parallel, but the statements of each sequence are processed serially. Upon the occurrence of a decisional rule, processing of the statements is halted while the continuing automatic iterative evaluations take place until the condition is fulfilled. In one embodiment, after the condition associated with the decisional rule so encountered is fulfilled once processing is resumed. In another embodiment, processing is resumed every time the condition is fulfilled.

Finally, this invention features a system and method for automatically processing a series of statements including commands which automatically halt further processing until a condition associated with each command is fulfilled. There are input means for entering a sequence of statements including one or more control commands each containing a condition. There are compiler means responsive to the input means for recognizing the input of a control command. There are processor means responsive to the compiler means for sequentially processing each statement and means responsive to the compiler means and the processor means for halting processing of the statements upon the occurrence of a control command. Automatic and continuing iterative evaluations are provided whether the condition associated with the control command is fulfilled and means to resume processing of the remainder of the statements in the sequence only upon the fulfillment of the condition associated with the control command. There may also be means for determining whether iterative evaluations of the condition associated with each control command are to continue after the remainder of the statements are processed.

DISCLOSURE OF PREFERRED EMBODIMENT

Other objects, features and advantages will occur to those skilled in the art from the following description of a preferred embodiment and the accompanying drawings, in which.

Figure 9:
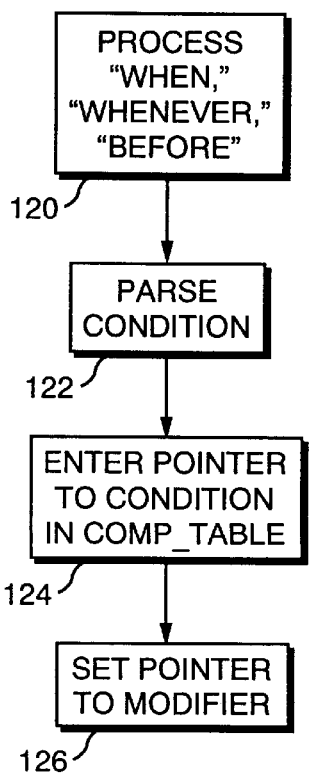
Figure 10:
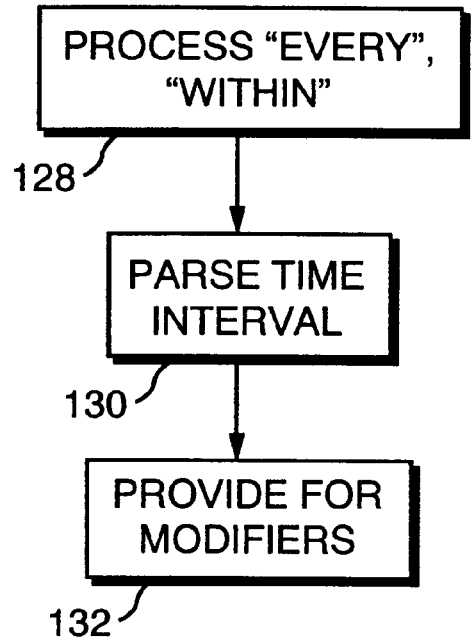
Figure 11:
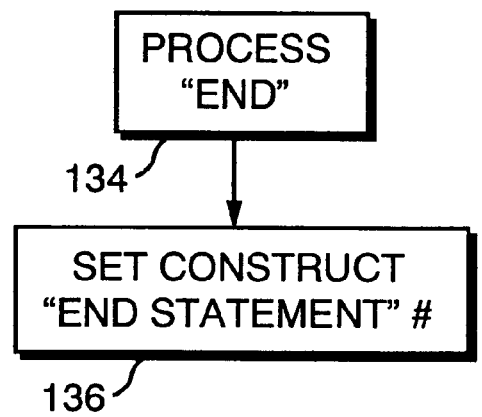
Figure 12:
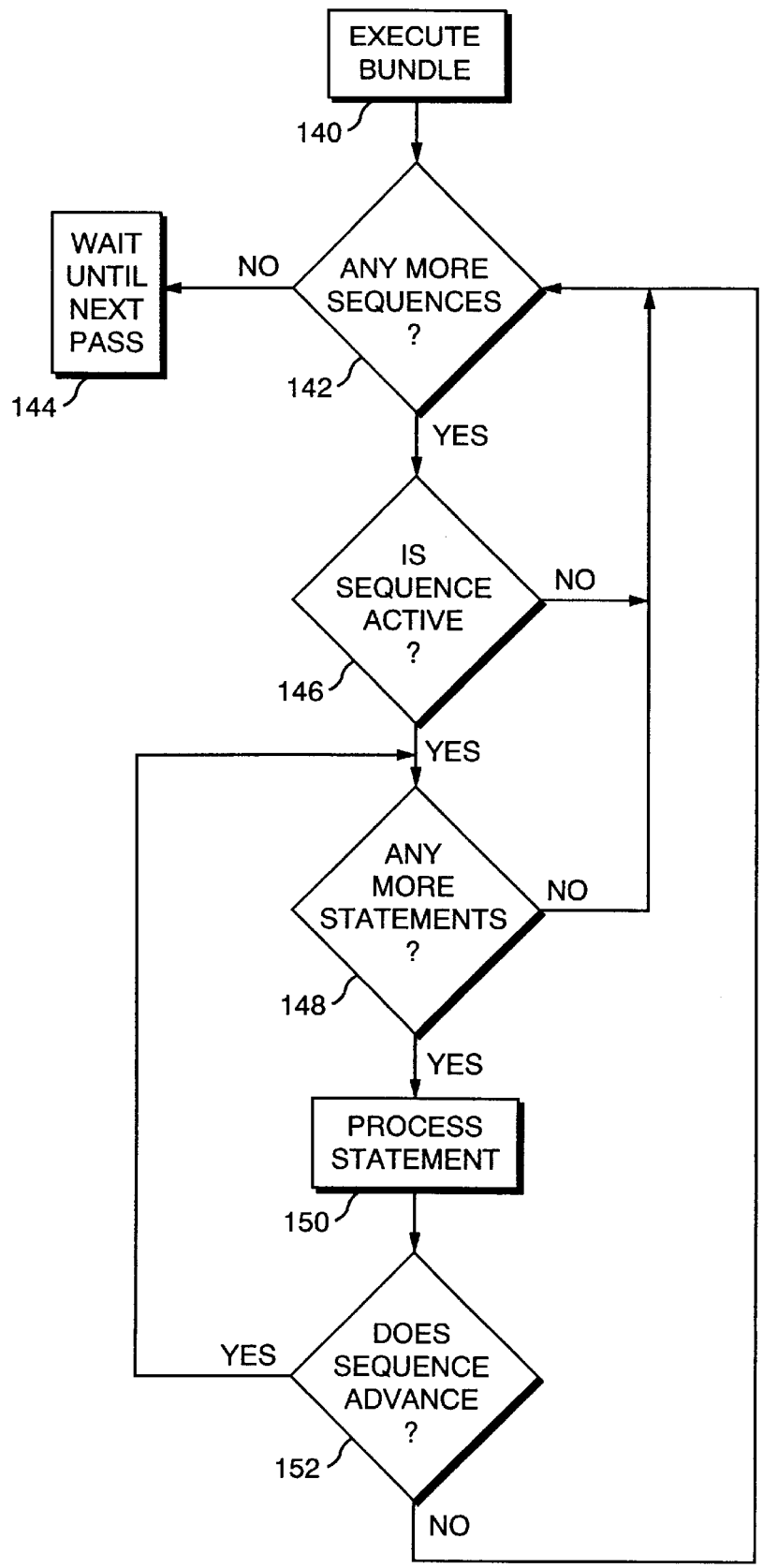
Figure 13:
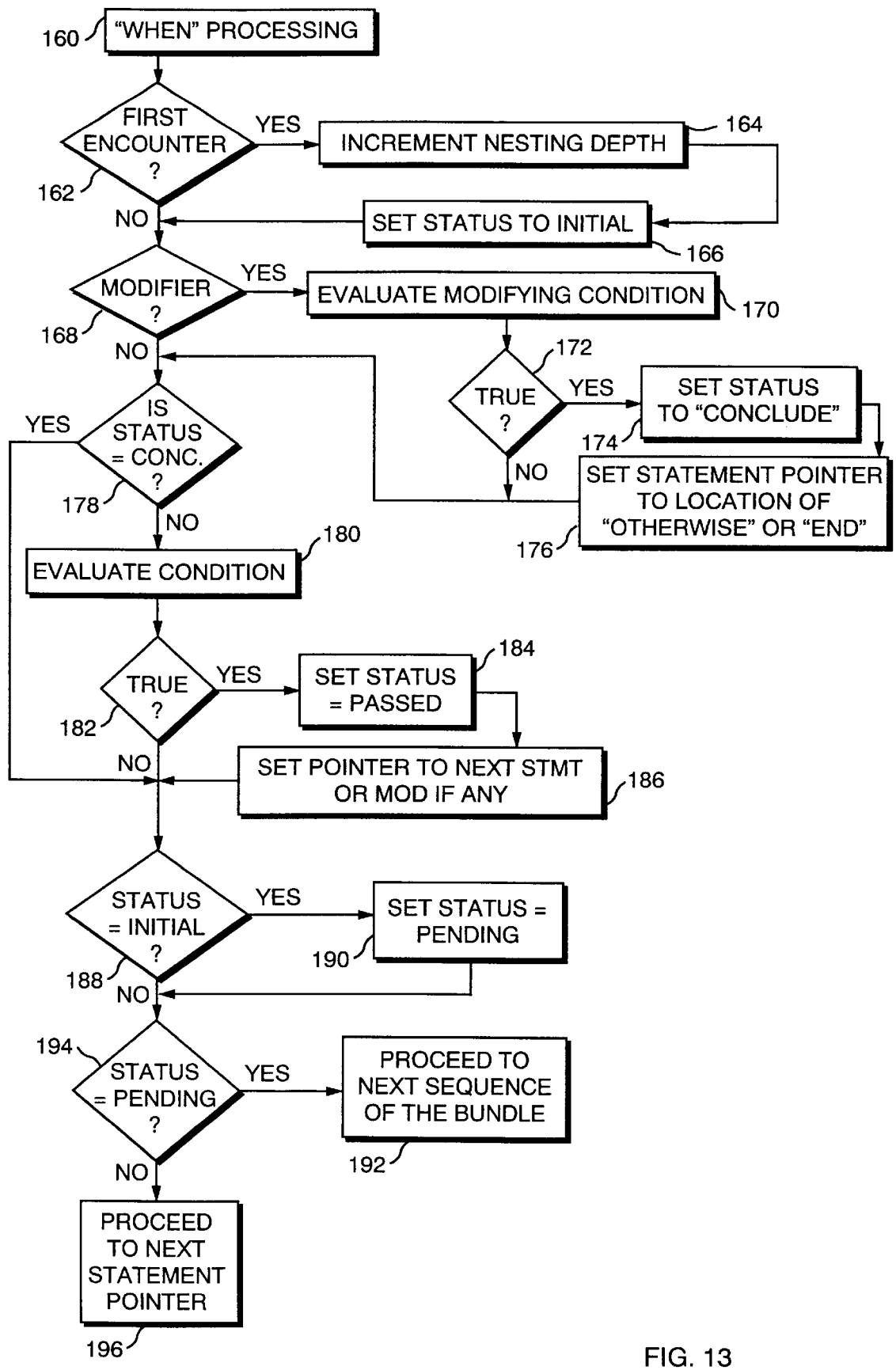

FIGS. 9, 10, and 11 are block diagrams of steps implemented to process, "when," "wherever," "before," "every," "within" and "end" statements according to this invention;

FIG. 12 is a block diagram of a routine to execute bundles according to this invention; and FIGS. 13, 14a, 14b and 15 are block diagrams of ADA routines used to execute and process "when," "wherever," and "every" statements according to this invention.

This invention may be accomplished by utilizing computer system 10, FIG. 1 in the following manner. There are means to enter or input a decisional rule, step 20, FIG. 2 such as keyboard 12, FIG. 1 coupled with a text editor 14 which allows processing of ASCII text as is common in the art.

The decisional rule will have a condition may be in the form "when [condition], [perform task]." For example, "when $T=T_{Launch}-30$, ignite boosters." For such a decisional rule, the current time must be 30 seconds before launch time of, for example, the space shuttle, before the boosters are ignited. When this condition is true, the system will proceed to ignite the boosters of the shuttle using the computer programs onboard the shuttle which accomplish that task. Of course, the condition as it is used here, may be much more complex and could involve any of the logic constructs used in processing computer based statements such as "and," "or," etc. logic constructs which link segments of a given condition together (i.e., "when A and B>C or C=D, [perform task]"). Or, as will be shown, the condition could be as detailed as "whenever X is true and Y is false, before temp=70 within 60 seconds, [perform task]." Furthermore, the task to be performed as used here may encompass a series of steps or commands such as "whenever temp>72, turn on air, update status, print out status, close inlet vents, etc.

Figure 1:
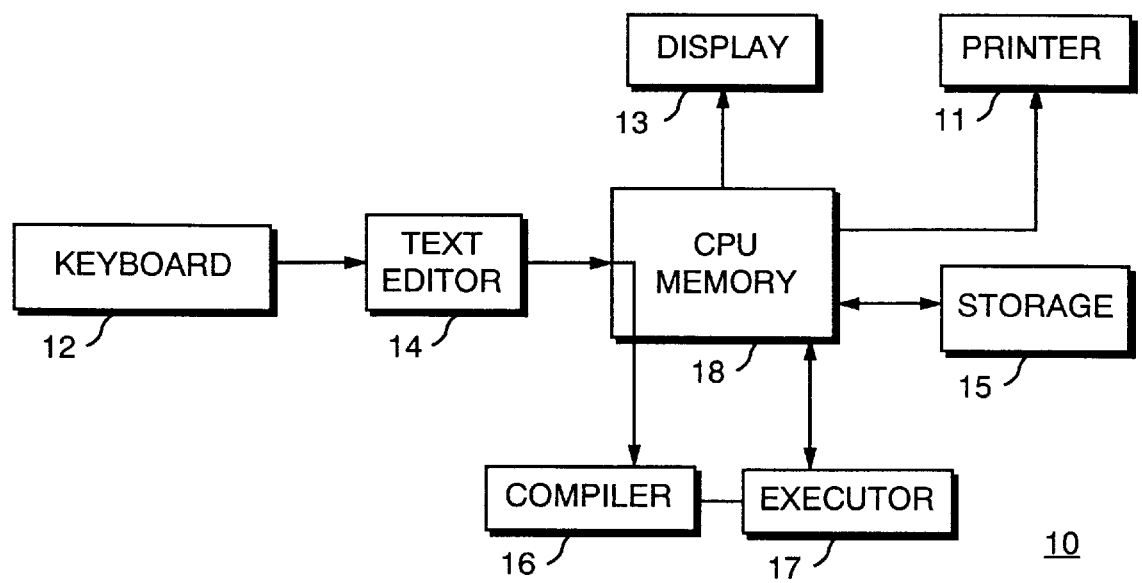
FIG. 1 is a diagram of a computer that can be used according to this invention.
Figure 2:
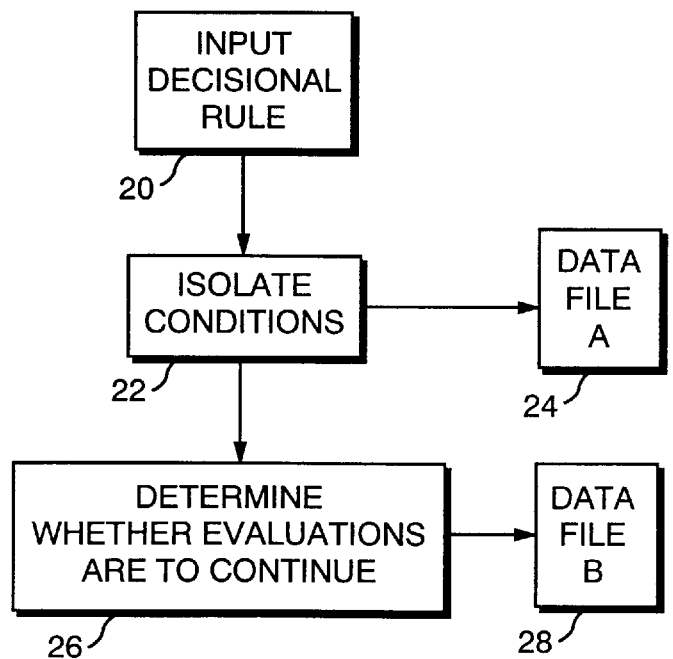
FIG. 2 is a block diagram of a compiler routine which can be used to implement this invention on the computer system of FIG. 1.

According to this invention, the decisional rule is typed on keyboard 12, FIG. 1, and text editor 14 interacting with keyboard 12 in conjunction with the CPU and memory of microprocessor 18, allows the compiler 16 to perform the task of isolating the condition, step 22, FIG. 2. Accordingly, the condition is sent to data file "A" 24 which may reside in memory of microprocessor 18 which may be a PROM, or a storage device 15 such as disc storage or tape storage as is common.

Conceptually, compiler 16, FIG. 1 also determines whether further evaluation of the decisional rule are to continue after the condition is fulfilled the first time during execution.

Figure 3:
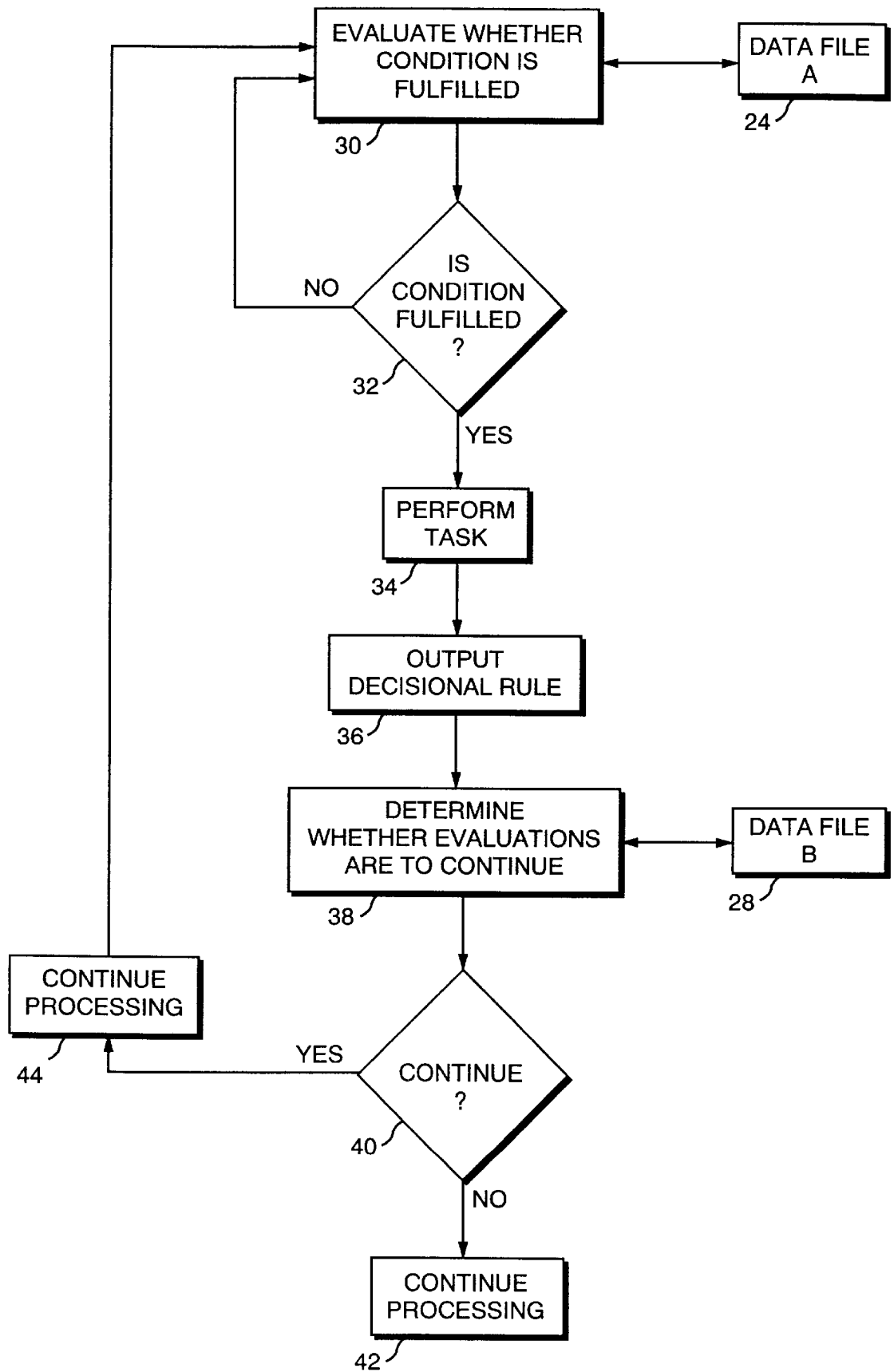
FIG. 3 is a block diagram of an executor routine which utilizes the information of the compiler routine of FIG. 2 for processing decisional rules according to this invention.

Executor 17, FIG. 1, will use the information compiled by compiler 16 to execute the decisional rule. At step 30, FIG. 3, evaluations of the condition for a given decisional rule is started and data file 24 which contains information about the condition is utilized.

If the condition is fulfilled at step 32, the task is performed, step 34, the decisional rule may be outputted, step 36, on display 13, FIG. 1, or printing device 11. CPU 18, then determines, from data file B, 28, FIG. 2, whether further evaluations are to be performed, step 38, FIG. 3. If no further evaluations are to be made, step 40, processing continues, step 42. If further evaluations are to be made, step 40, processing continues, step 44, but further recursive evaluations of the condition of the entered decisional rule are also performed, step 30.

The difference whether further recursive evaluations are to be performed after the condition entered is fulfilled once lies in the type of the command or statement present in the decisional rule entered at step 20, FIG. 2.

For example, a "when" statement may be conceptualized as a gate across a straight road. The gate must be opened (i.e., the condition must be fulfilled) before processing can continue. The difference between "when" and "if" logic is time. Processing of "if" statement is not time based. If the condition is not fulfilled when the if-based decisional rule is executed, the next line of code is executed. To recursively evaluate the if-based decisional rule, those skilled in the computer science art must include additional programming logic to force recursive evaluations.

In this invention, however, the determination whether processing is to continue is performed automatically. Furthermore, iterative evaluations are automatically provided without the need for additional programming "loops" which many users are unskilled at designing. For a "when" statement, compiler 16, FIG. 1, determines, step 26, FIG. 2, that no further evaluations of the condition of the decisional rule are to be performed after the condition is fulfilled once.

A "whenever" statement may be conceptualized as a gate across a circular track. Processing must wait for the gate to be opened (i.e., the condition to be fulfilled) before processing can continue. After the condition is fulfilled once, processing then continues, but processing also automatically returns to the "whenever" statement decisional rule. Hence, compiler 16, FIG. 1, determines step 26, FIG. 2, that evaluations are to continue after execution and stores this information in data file B, 28.

An "every" command directly involves a time interval (i.e., "every 12 seconds, check temperature"). When the "every" statement is encountered, an evaluation whether 12 seconds has elapsed is immediately performed and the task is performed if the specified time period has elapsed. These and similar type time-based commands are acceptable for this invention because it is automatically determined whether processing is to continue and processing is not continued until the condition following such commands are fulfilled.

Figure 4:
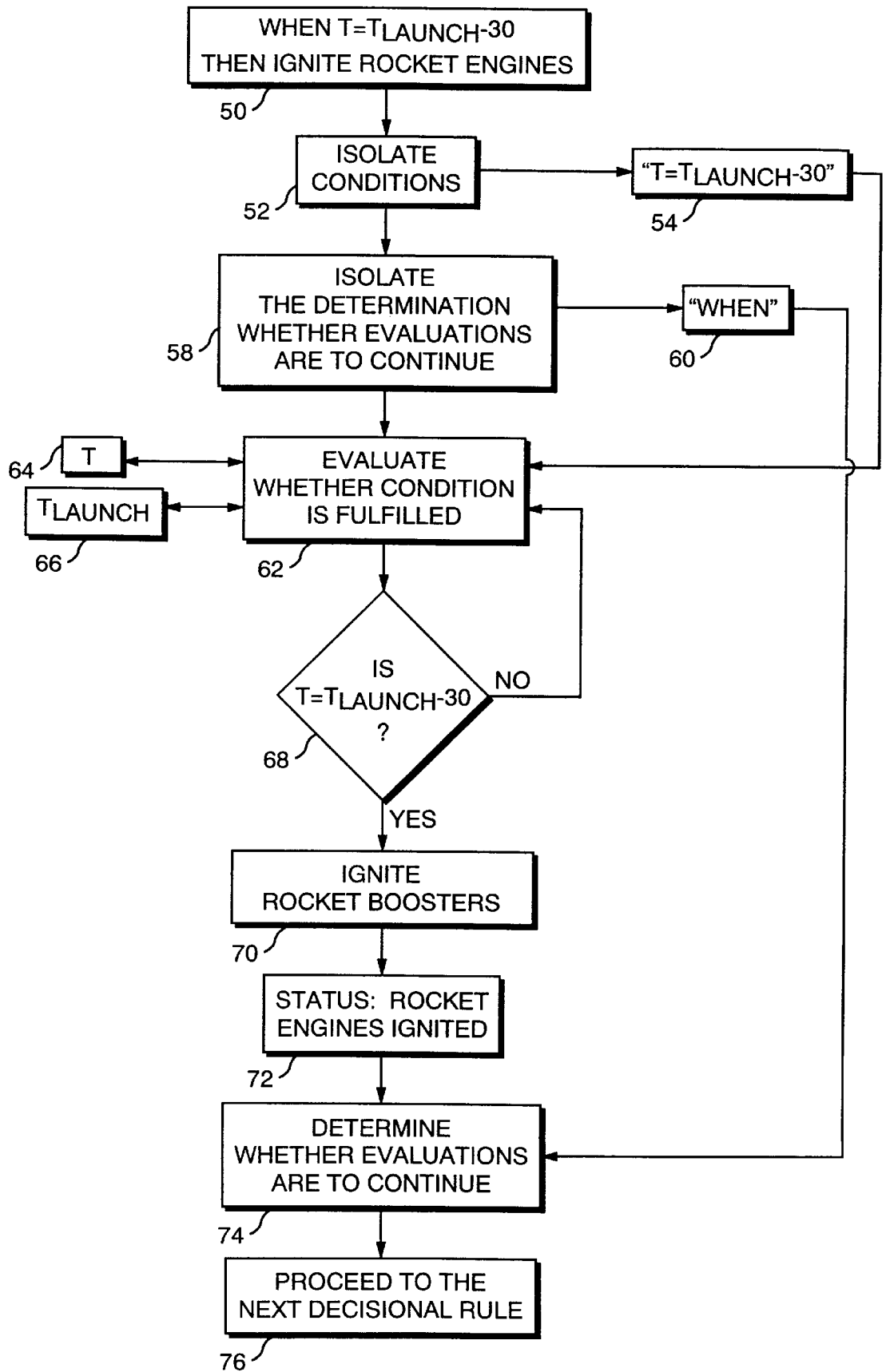
FIG. 4 is a block diagram of one example of a particular decisional rule according to the routines of FIGS. 2 and 3.

Using the example heretofore delineated, on the space shuttle incorporating this invention the decisional rule is entered, step 50, FIG. 4. The condition "$T=T_{Launch}-30$" is isolated, step 52 and stored, step 54. The determination whether evaluations are to continue is made, step 58 and this information is stored, step 60. This processing may be accomplished by compiler 16, FIG. 1 performing the process flow of FIG. 2.

Executor 17, FIG. 1 then executes the decisional rule upon command. The condition "$T=T_{Launch}-30$" is evaluated, step 62, FIG. 4, using values for time "T" at block 64 and the launch time "$T_{Launch}$" at block 66 which may be determined by the shuttle's operating computer programs. If, upon execution of the decisional rule, it is 30 seconds before launch time, step 68, the rocket boosters are ignited, step 70 and this may be outputted, step 72. If it is not 30 seconds before launch, step 68, processing returns to step 62 for automatic recursive evaluation of the condition.

This novel automatic recursive evaluation feature allows those not skilled in the computer science disciplines to enter a command such as "when" instead of "if" type statements which would require "loops" of programming logic to enable executor 17, FIG. 1, to recursively evaluate the conditions.

Once the condition is fulfilled, and the rocket boosters are ignited, the executor then determines whether the recursive evaluations are to continue after the condition is fulfilled once, step 74. Since a "WHEN" command was isolated, step 58, and stored, step 60, once the time is 30 seconds before launch and hence the condition is fulfilled once, no further evaluations are required and processing continues, step 76, without returning to further evaluation of the entered decisional rule. Had a "WHENEVER" type command been entered, recursive evaluations of the condition contained in the decisional rule would have been performed automatically, step 40, FIG. 3 and step 44 returns processing to step 30 where the evaluations of whether the condition is fulfilled is encountered.

This invention is not limited to the actual terms "WHENEVER," "WHEN," "EVERY," etc. Obviously, any terms which connote time or even symbols or representative code words or numbers could be utilized.

In a preferred embodiment this invention may be accomplished by the following logic using a high level computer language in association with computer 10, FIG. 1. In summary fashion, the processing may be described thus: "compilation" describes the process by which ASCII text is converted to a form that can be executed by the executor. Each statement is read sequentially and the syntax is error checked. The information relative to each statement for use by the executor is stored. The executor then, upon command, processes each statement sequentially until a control command is encountered in a statement. The control command will be followed by a condition. If the condition currently being waited for is fulfilled, the statement pointer is incremented and the remaining statements are executed until stopped by another control statement. If the condition is not fulfilled, the statement pointer is not incremented and processing is not continued until the condition is fulfilled.

Figure 5:
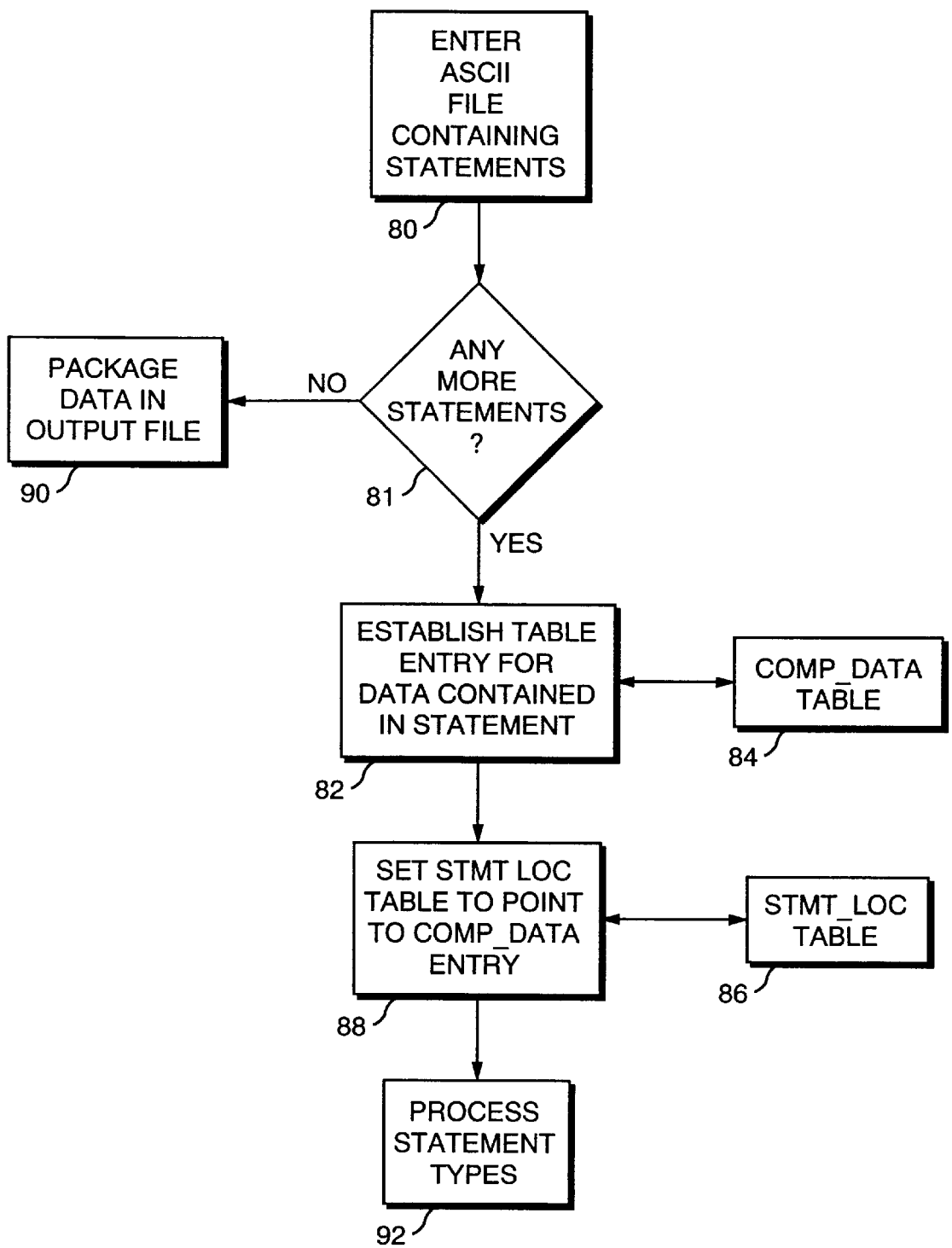
FIG. 5 is a block diagram of a more specific routine for a compiler using the ADA programming language implemented within the computer of FIG. 1.

At compiler time, using compiler 16, an ASCII file containing statements is entered, step 80, FIG. 5. For each statement, table 84 is established for the data contained in the statement, step 82. Also, a statement locator table 86 is established and at step 88 the statement locator at table 86 is set to point to the corresponding table entry for each statement. If there are no further statements, step 81, all the data associated with each statement entered may be packaged in an output file, step 90. If there are further statements, they are processed according to the logic described above. After all the statements are entered, they are processed, step 92, according to the logic more particularly delineated with reference to FIGS. 6–15.

Statements may be "bundles," "sequences," or control statements such as "when," "whenever," and "before." In a preferred embodiment each bundle contains sequences of statements including decisional rules which are to be processed sequentially.

An entire program for a given application is known as a "script." Within a script, the logic is organized according to the following Hierarchy:

```
        BUNDLE
   SEQUENCE/SUBSEQUENCE
        STATEMENT
        COMPONENT
```

The following sections describe the various entities that comprise the hierarchy of this logic.

The "BUNDLE" level of the logic hierarchy may be used to package a set of sequences and subsequence related to a particular BUNDLE, which are to be processed in a particular way. For example, different "activities" may be created to contain sequences that should be processed at disparate rates, or sequences that should be processed by separate machines in a distributed processing environment. An "BUNDLE" is delineated as follows:

```
BUNDLE name
   statements
CLOSE BUNDLE
```

If all sequences are to be processed within the same operating environment the "BUNDLE" level of the above described hierarchy may be omitted.

The "sequence" creates a stream of execution to be processed in parallel with other sequences. The "subsequence" is a series of statements that may be processed within the stream of execution established by the sequence that calls the subsequence by means of a CALL statement using the ADA programming language. All executable statements must be included in a sequence or subsequence. Sequences and subsequences are delineated as follows:

```
SEQUENCE name
   statements
CLOSE SEQUENCE
SUBSEQUENCE name
   statements
CLOSE SUBSEQUENCE
```

All sequences start out active. If the processing embodied in the sequence should not begin immediately it may be delayed by means of a "when" or "wait" statement placed at the top of the sequence.

Within a sequence or subsequence are "statements". The type of statement is always determined by the first word in the statement. There are three main categories of statements: blocking statements used to delineate BUNDLE, SEQUENCE, and SUBSEQUENCE blocks; control statements used to specify the conditions under which actions should occur or the tasks are to be fulfilled; and action statements that specify actions to be carried out when the statements is executed.

The following sections describe the control statements and action statements that are available in a preferred embodiment. Control statements are statements that specify the conditions under which actions should occur, or that control program flow.

Several of the control statements initiate "constructs" that may be closely followed by an END statement. Other control statements called "modifiers" may optionally be used within one or more of these constructs.

The WHEN statement specifies conditions under which other statements will be executed, on a one time basis. The WHEN statement initiates a WHEN construct of the form:

```
WHEN boolean_component
   statements
END WHEN
```

The boolean_component is any object of expression that is either true or false. When the WHEN statement is encountered processing will automatically wait until the boolean_ component evaluates as true, and will then execute the statements within the WHEN construct. Execution will then continue at the statement following the END WHEN statement. As discussed above, a WHEN statement may be thought of as a gate across a straight road. The gate must open to allow processing to continue. A WHEN statement may be modified by a BEFORE or WITHIN statements as described below. Control constructs may be nested within a WHEN construct, or within any of the other constructs described below. The WHENEVER statement specifies conditions under which other statements will be executed, on a repeating basis. The WHENEVER statement initiates a WHENEVER construct of the form:

```
WHENEVER boolean_component
    statements
END WHENEVER
```

When a WHENEVER statement is encountered processing will automatically wait until the boolean_component evaluates as true, and will then execute the statements within the WHENEVER construct. The statements will be executed again upon the next false-to- true transition of the boolean component following their completion. As discussed above, a WHENEVER statement may be thought of as a gate along a circular road. Processing must wait for the gate to open before beginning another lap. A WHENEVER statement may also be modified by a BEFORE or WITHIN statement as described below. Without such modification the loop created by the WHENEVER statement will continue indefinitively. The EVERY statement creates a loop that will execute repeatedly, at a specified interval. The EVERY statement initiates an EVERY construct of the form:

```
EVERY time_interval
    statements
END EVERY
```

When the EVERY statement is encountered the statements enclosed by the construct are immediately executed, and will be executed again and again at the specified time_interval. An EVERY statement may be modified by a BEFORE or WITHIN statement as described below. Without such modification the loop created by the EVERY statement will also continue indefinitely. A loop created by an EVERY statement may contain WHENs and other time-consuming constructs. As implemented, the loop will not restart until the previous interval is completed, even if that causes the specified time interval to be exceeded.

The BEFORE statement is a modifier that can be used to terminate the wait implied by a WHEN statement, or to terminate the loop created by a WHENEVER or EVERY statement, if a particular condition occurs. The BEFORE statement is of the form:

```
BEFORE boolean_component
```

The BEFORE statement may be added to the WHEN construct as follows:

```
WHEN boolean_component
BEFORE boolean_component
    statements
[OTHERWISE
    statements]
END WHEN
```

When a WHEN construct is modified by a BEFORE statement, the statements within the construct will be skipped if the condition in the BEFORE statement occurs before or at the same time as the condition in the WHEN statement. An OTHERWISE statement followed by a second block of statements may be included.

These statements are executed when and if the BEFORE condition occurs before or at the same time as the WHEN condition. Whichever condition occurs first, execution will continue at the statement following the END WHEN statement.

The BEFORE statement may be added to a WHENEVER or EVERY construct as follows:

```
WHENEVER boolean_component
BEFORE boolean_component
    statements
END WHENEVER
EVERY time_interval
BEFORE boolean_component
    statements
END EVERY
```

When a WHENEVER or EVERY construct is modified by a BEFORE statement, the loop created by the WHENEVER or EVERY statement will be terminated when the BEFORE condition occurs and execution will resume at the statement following the END statement.

The WITHIN statement can be used to terminate the wait implied by a WHEN statement, or to terminate the loop created by a WHENEVER or EVERY statement, if a specified time interval expires. The WITHIN statement is of the form:

WITHIN time_interval

The WITHIN statement may be added to a WHEN, WHENEVER, or EVERY construct in the same way as the BEFORE statement described above, and the action taken upon expiration of the time interval of a WITHIN statement is the same as the that taken upon fulfillment of the condition in a BEFORE statement.

The IF statement may also be used to make a decision without reference to time, and continue regardless of the result, as in a conventional prior art system. The IF statement initiates an IF construct of the familiar form:

```
IF boolean_component
    statements
{ELSEIF boolean_component
    statements}
[ELSE
    statements]
END IF
```

The WAIT statement introduces a pause into a sequence. The WAIT statement is of the form:

WAIT time_interval

The CALL statement is used to invoke a subsequence from a sequence or another subsequence. The CALL statement is of the form:

CALL name_of_subsequence

When the statement is executed, control is transferred to the first executable statement in the subsequence. When the subsequence ends, control is returned to the statement following the CALL statement.

Action statements specify the actions or the task to be performed under conditions determined by control statements. Unlike control statements, which are independent of the application in which the logic is embedded, action statements must be tailored to the needs and capabilities of the particular application.

The LOAD statement is used to load a computer variable with data. It may be thought of as equivalent to an assignment statement. The LOAD statement has the form:

LOAD var_name=data

"var_name" is the name of a boolean, numeric, or character string variable known to the system. Var_name may include subscripts if the variable is arrayed. Data consist of a list of components of type and number corresponding to the type and arrayness of the variable. The data may be in the form of literals, variables, or algebraic combinations.

The PRINT statement is used to "print" or otherwise display the contents of a variable. The PRINT statement is of the form:

PRINT var_name where var_names is the name of a variable known to the program, including optional subscripts.

The EXECUTE statement is used to command execution of a software module. The EXECUTE statement is of the form:

EXECUTE module_name where module_name is the name of a software module know to the program.

The ABORT statement is available in applications where the process is being used to sequence a simulation. It consist of the single word ABORT. When the statement is encountered, a request is made that the simulation be immediately stopped.

The KEY statement is used to input one or more keystrokes to the interface of the application in which the program is installed. The KEY statement is of the form:

KEY list_of_keystrokes where list_of_keystrokes is a series of keywords naming particular keystrokes that are valid in the system to which the program is attached.

The DEFINE statement allows a name to be assigned to a component of any type. The DEFINE statement is of the form:

DEFINE name AS component
For example, the DEFINE statement
DEFINE ASCENDING AS HDOT>0 allows a subsequent WHEN construct to be written as follows:

WHEN ASCENDING
  statement
END WHEN

Similarly, the DEFINE statement

DEFINE SAFE_TEMP AS 100 TO 125 allows a WHENEVER construct to be written as follows:

WHENEVER TEMP OUTSIDE SAFE_TEMP
  CALL ADJUST_TEMP
END WHENEVER

The DEFINE statement allows a component to be hidden behind a descriptive name, which may improve the readability of a script.

Sequence and subsequences contain statements, and statements in turn contain "components." Components are single or arrayed entities of one of the three principal types, boolean, numeric, or character string, that are recognizable.

Components must belong to one of three types boolean, numeric, or character string. Within each type, components may be compared or combined without restriction.

Components may also vary in number, or "arrayness." Where necessary, the arrayness of components is required to match. An array may be "loaded" from a component or the same arrayness, or from an unarrayed component (in which case all elements are loaded to the same value). Similarly an array may be compared by means of "=" to an unarrayed component (all elements must match) or a component of the same size. But a compile-time error message is generated if the user attempts to load an arrayed component from, or compare it to, an arrayed component of unequal size.

A variable is a single or arrayed variable of boolean numeric, or character string type. When variables are compared or combined only the total number of elements must be compatible.

A boolean literal is one of the following words: TRUE, FALSE. The alternate forms ON and OFF are also accepted.

A numeric literal is a string of digits, possibly preceded by a plus or minus sign, containing at most one decimal point, and possibly followed by an exponent. The precise forms of numeric literal that are acceptable depend on the language in which a particular version of the logic is implemented. Numeric literals in days: hours:minutes: seconds format are also permitted. Here are examples of numeric literals that are acceptable to the Ada-language implementation of this invention:

100
1.333333E+5
59:59:30.0
2#11111111#

Numeric literals are stored as double-precision floating point numbers.

A character string literal is a string of characters enclosed by single or double quotation marks.

A combination combines components of compatible type of means of one of the following operators, listed in order of precedence, with allowed alternative forms in some cases:
OR logical "or"
AND logical "and"
=equals
/=not equals
<less than
<=less than or equals
>greater than
>=greater than or equals
IN INSIDE within range
OUT OUTSIDE outside of range
TO . . . range
+addition
−subtraction
* multiplication / division
MOD modulo
** exponentiation
ÖÖ & concatenation A combination may be of boolean, numeric, or character string type, depending on the type that results from evaluation the combination. Here are examples of combinations of boolean type:

---
EVENT_301 OR EVENT_302
DAP_MODE /= "ATT_HOLD"
VEL(1) >= 12345.6
TEMP IN 100 TO 125
---

Here are examples of combinations of numeric type:

---
A*B**(C+1)
COUNT MOD PHASE
---

Here is an example of a combination of character string type:
"AUTOPILOT MODE IS" & DAP_MODE A modification handles cases where a boolean component is modified by being preceded by a NOT, or a numeric component is modified by being preceded by a + or − operator. Examples:

---
NOT EVENT_301
−JET_THRUST(12)
---

A function consists of a component enclosed by parentheses and preceded by a function operator. Numeric functions may exist as defined by the following operators:
ABS absolute value
SQRT square root
SIN trigonometric sine
COS trigonometric cosine
TAN trigonometric tangent
ARCSIN trigonometric arcsine
ARCCOS trigonometric arccosine
ARCTAN trigonometric arctangent A list is a group of components of the same type separated by commas. The "arrayness" of the list is the same of the arrayness of the listed components. Here are examples of lists:

---
TRUE, TRUE, FALSE, FALSE
FLAG(1), FLAG(2) /= FLAG(3), FLAG(4)
1, 2, 3, 4, 5
POS, VEL, ACC
---

A range consist of two numeric components separated by a range operator. A distinction is made between a fixed range (which can be evaluated at compile time) and a variable range. Only a fixed range is legal in subscripts. Examples of a fixed and a variable range follows:
1 TO 3

A definition is a component created by the DEFINE statement as described above.

Figure 6:
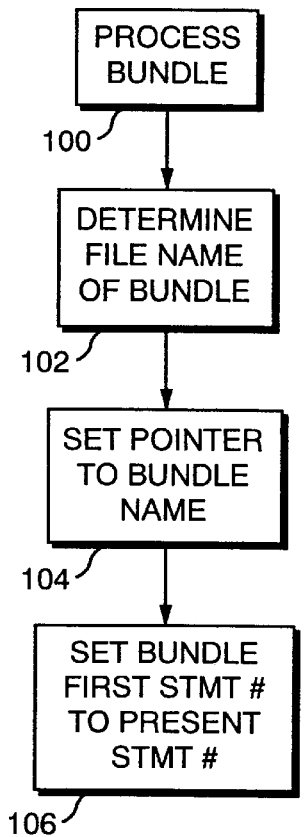
FIGS. 6–7 are block diagrams of routines used to process bundles and sequences of the present invention.

Thus, if the statement is a bundle, step 100, FIG. 6 the name of the bundle is determined, step 102, the pointer is set to the bundle name, step 104, and the first statement number of the bundle is set to the present statement number, step 106.

Figure 7:
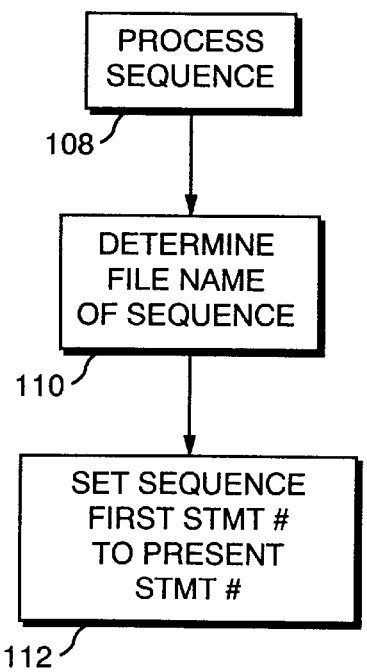

If the statement is a sequence, step 108, FIG. 7 the file name of the sequence is determined, step 110, and the first statement number is set to the present statement number, step 112.

Figure 8:
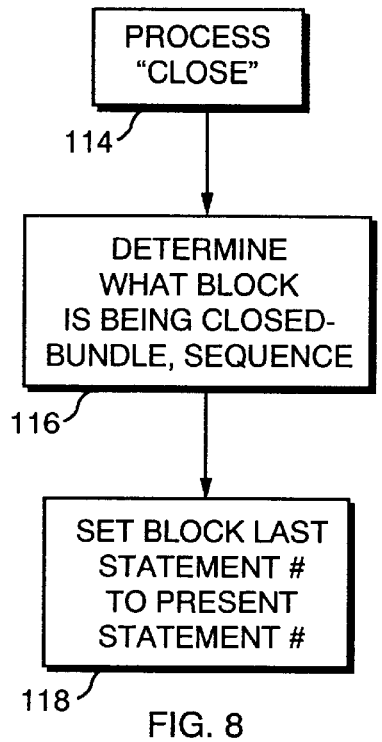
FIG. 8 is a block diagram of processing "close" statements according to this invention.

If the statement is a "close" statement, step 114, FIG. 8, the block being closed (e.g., bundle, sequence, etc.) is determined, step 116 and the block's last statement number is set to the present statement number, step 118.

For control statements, such as "when," "whenever," and "before" step 120, FIG. 9, the condition associated with each statement is parsed, step 122, the pointer is entered, step 124 to that condition in table 84, FIG. 5, and the pointer is set to the modifier if any, step 126, FIG. 9. For statements such as "every" and "within," step 128, FIG. 10 the time interval associated with the control statement is parsed, step 130 and the modifiers are provided for much like as with "when" and "whenever" control statements, step 132. For the "END" statement, step 134, FIG. 11, the construct END statement number is set, step 136.

Processing according to the logic structure heretofore delineated, may be accomplished, using an ADA program.

Thus, compiler 16, FIG. 1, may perform, among other tasks, the step of parsing the decisional rule and isolating the decisional rules. Executor 17, may perform the automatic iterative and continuing evaluations of the decisional rules according to the following logic:

Each bundle, step 140, FIG. 12 is executed in parallel as follows. If there are no more sequences in the bundle being executed, step 142, processing of that bundle is halted until the next pass, step 144. If there are further sequences, a determination is made whether the current sequence is active. If the sequence is active, that sequence and the statements contain within it are not processed, step 146. If the sequence is active, the statements contained within it are processed, step 150 until there are no further statements, step 148. The processing of individual statements is described in more detail in FIGS. 13–15.

If the sequence advances, step 152, all the statements within it are again processed, steps 148 and 150. If the sequence does not advance, the next sequence is executed accordingly.

A "WHEN" control statement is processed as follows: "WHEN" processing begins step 160, FIG. 13, as a "WHEN" statement is encountered in a sequence being executed. If it is the first encounter, step 162, the nesting depth is incremented, step 164 the status is set to initial step 166. Then, or if it is not the first encounter, it is determined whether a modifier exist following the "WHEN" statement, step 168 if there is a modifier, it must be evaluated first and accordingly, step 170 the modifying condition is evaluated. If it is true, step 172 the status is set to conclude, step 174 and the statement pointer is set to the location of the "OTHERWISE" or "END" statement if any, step 176. If the modifying condition is not true or if there is no modifier the status of the decisional rule is checked, step 178. Only if the status does not equal "conclude," is the condition following the "WHEN" statement evaluated, step 180. If the condition is true, step 182 the status is set to "passed," step 184 the pointer is set to the next statement of modifier if any, step 186 and the status is again checked. If the status is "initial," step 188 the status is set to "pending," step 190 and processing proceeds the next sequence of this bundle, step 192. If the status is not set to "pending," step 194, processing proceeds to the next statement pointer, step 196.

Figure 14A:
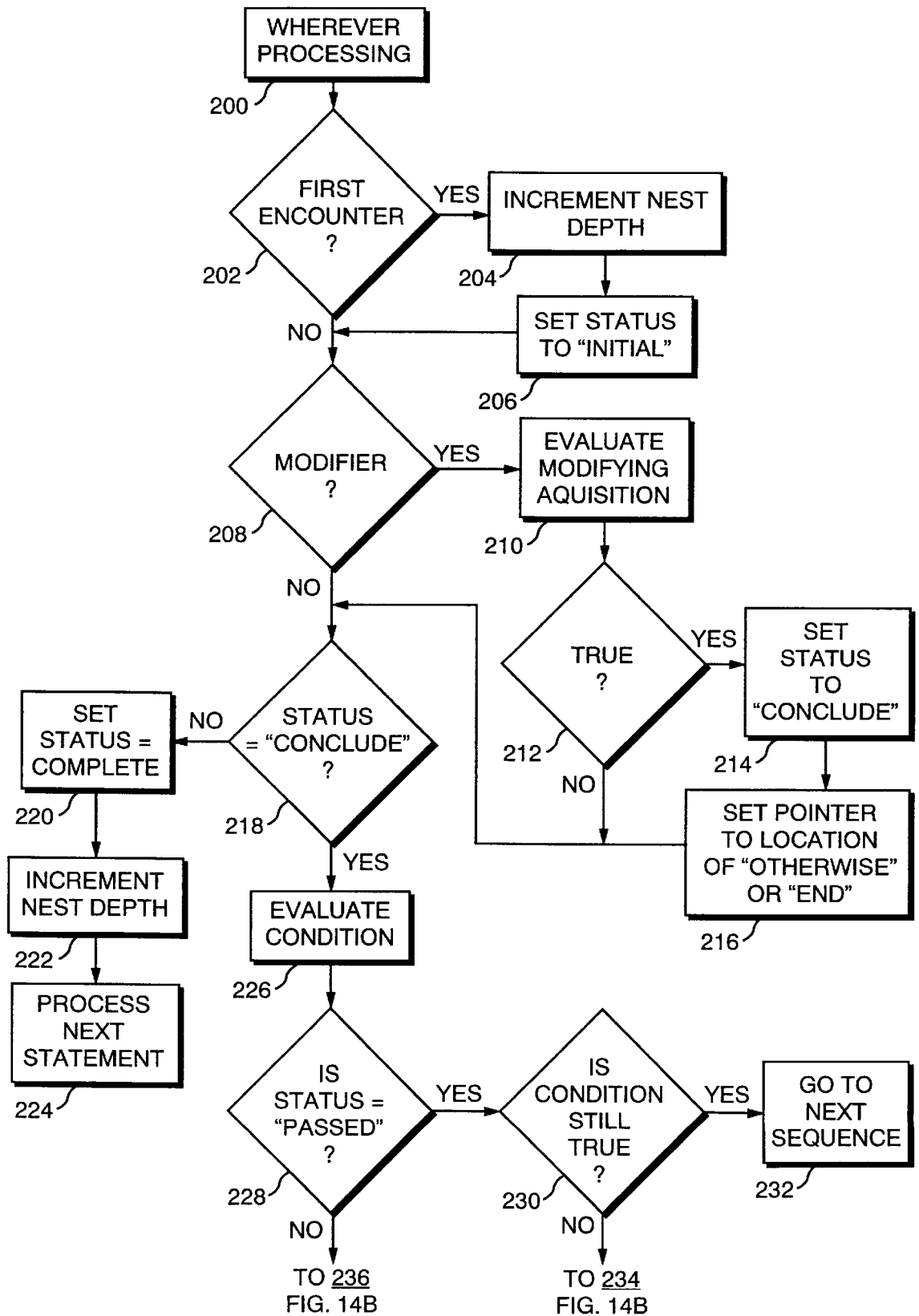
Figure 14B:
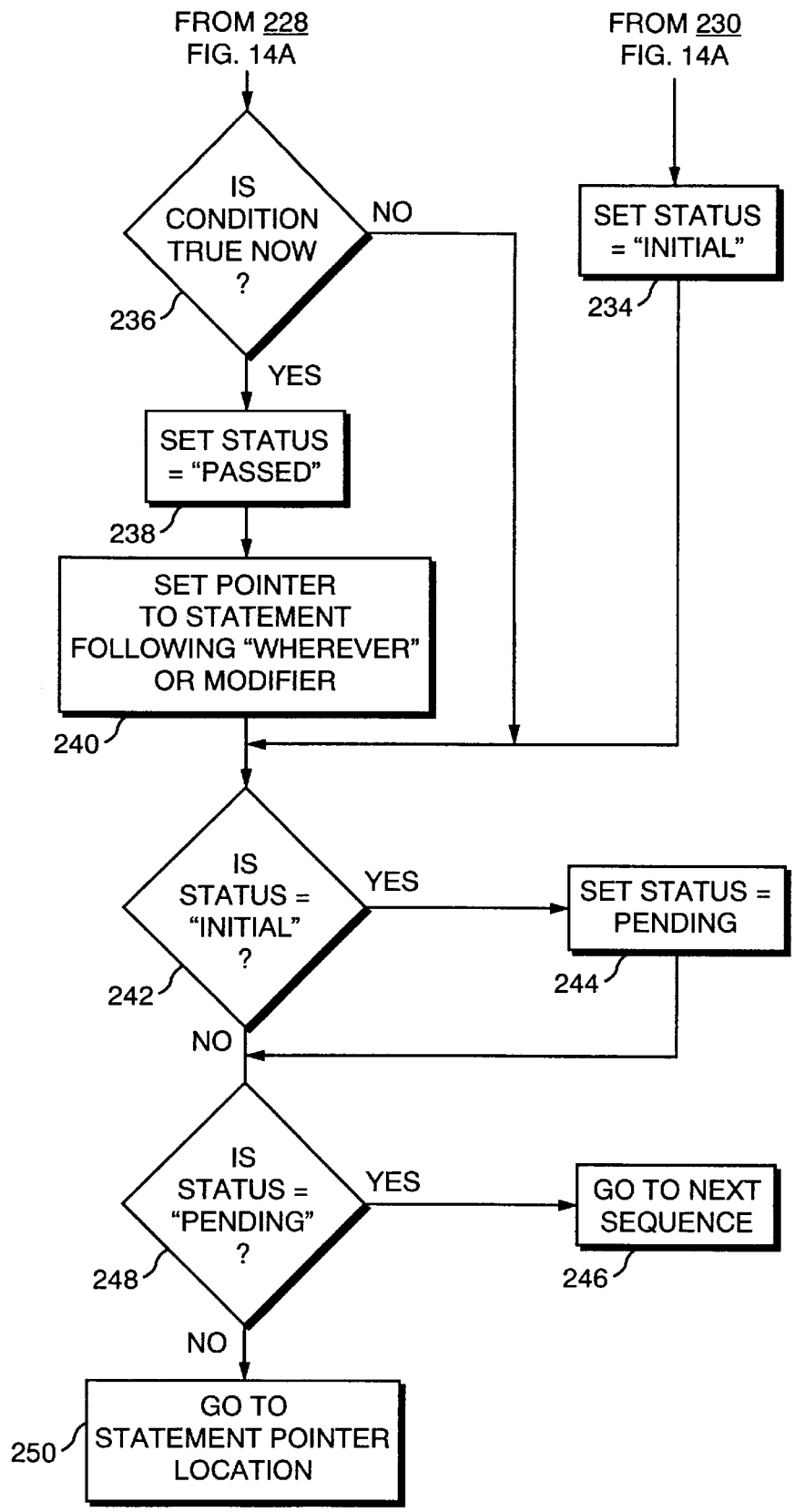

"WHENEVER" processing, step 200, FIG. 14a is somewhat more complicated since the condition following the "WHENEVER" statement must be evaluated even after the condition is fulfilled once. As the "WHENEVER" statement is encountered, it is first determined whether this is the first time the "WHENEVER" statement is encountered, step 202. If it is, step 204, the next step is incremented and the status is set to "initial," step 206. Thereafter, or if it is not the first encounter, step 202, it is determined step 208 whether a modifier follows the "WHENEVER" statement. If there is a modifier, the modifying condition is evaluated step 210 and if true step 212 the status is set to conclude step 214 and the pointer location is set to the location of the "OTHERWISE" or "END" statement if one exists, step 216. Thereafter, or if the modifying condition is not true, processing continues and it is determined whether the status is set to "conclude," step 218. If it is, the status is set to "complete," step 220, the next step is incremented step 222, and the next statement is processed, step 224. If the status is not "conclude," the condition following the "WHENEVER" statement is evaluated step 226. If the status is past, step 228, a determination is made whether the condition is still true step 230 and if it is the next sequence is evaluated step 232. This logic assures that a change in status, or in other words, a change in the condition has occurred, before further processing of the "WHENEVER" statement continues. If the condition is not true at step 230 the status is sent to "initial," step 234 and processing continues in accordance with FIG. 14b. If the status is not set to "passed" at step 228, a determination is made whether the condition is true now, step 236 if it is, the status is set to "passed" step 238 and the pointer statement is set to the statement following the "WHENEVER" or the modifier "IF ANY" step 240. If the statement is not true now, a determination is made whether the status is set to "initial" step 242, FIG. 14b. If it is, the status is set to "pending," step 244 and the next sequence is evaluated step 246. If the status is not set to "initial" a determination is made whether the status is set to "pending," step 248. If it is, the next sequence is evaluated, step 246; if it is not set to "pending," processing goes to the next pointer location, step 250.

Figure 15:
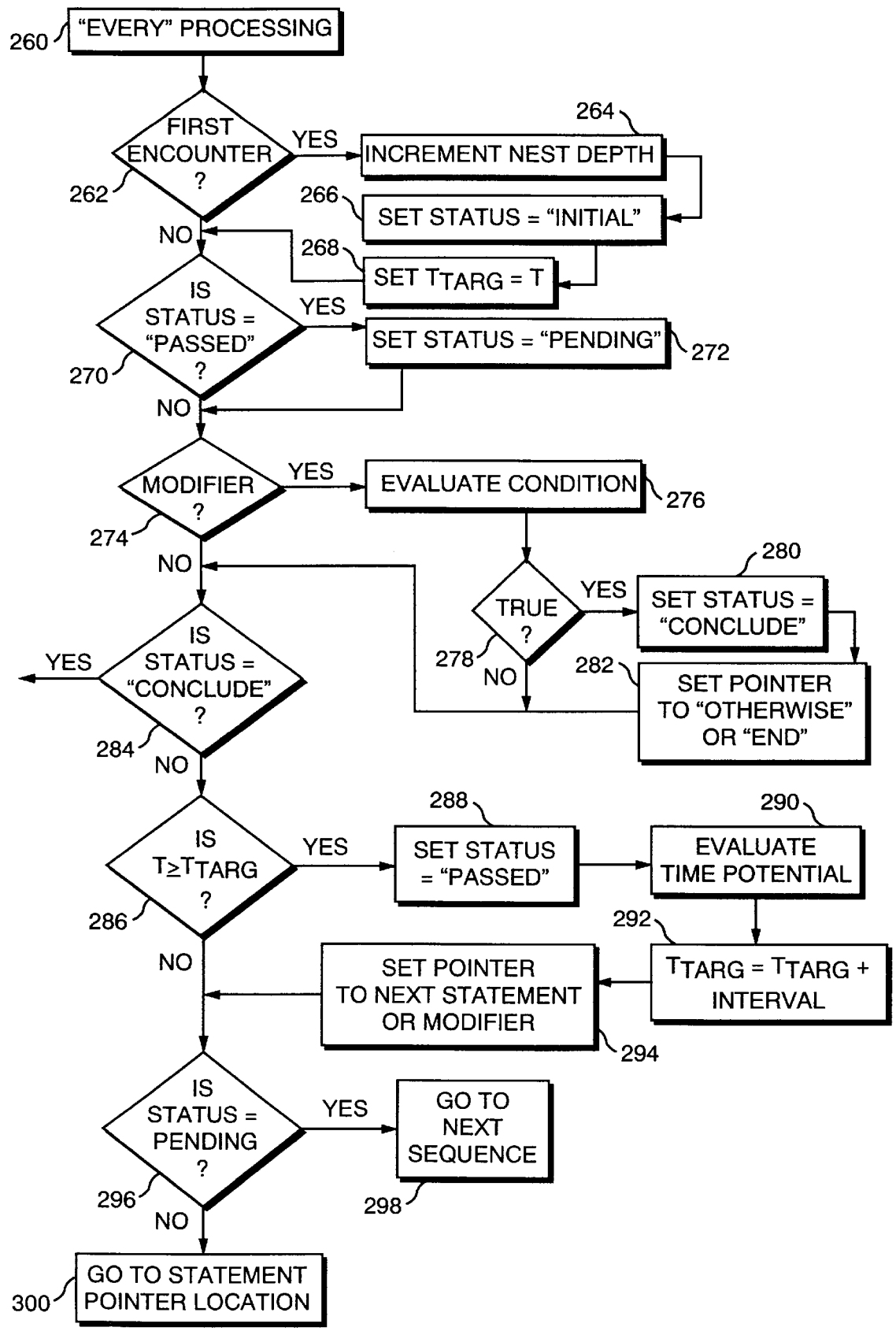

"EVERY" processing, step 260, FIG. 15, proceeds much like "WHENEVER" processing except, of course, the condition evaluated is based on a time interval. A determination is made whether this encounter is the first, step 262 and if it is, the next step incremented, step 264, the status is set to "initial," step 266, and the target time is set to the present time, step 268. Thereafter, or if this pass is not the first encounter determined at step 262, the determination is made, step 270, whether the status is set to "passed". If it is, the status is set to "pending," step 272 and thereafter, or if the status was not previously set to "passed" at step 270, a determination is made whether a modifier exist following the every statement, step 274. If a modifier does exist, the condition following the modifier is evaluated, step 276, and if true, step 278, the status is set to "conclude," step 280, and the pointer is set to the "OTHERWISE" or "END" statement, step 282, if one exists. Thereafter, if the condition was found not to be true at step 278, a determination is made whether the status is set to "conclude," step 284. If the status is set to "conclude," processing continues as with "WHENEVER" processing FIG. 14a. If the status is not set to conclude a determination is made whether the current time is greater than or equal to the target time step 286 and if it is the status is set to "passed," step 288, the time interval is evaluated, step 290, and the target time is set to the previous target time plus the time interval evaluated step 292. The pointer is set to the next statement or modifier, step 294 and thereafter, or if the determination made at step 286 returns a false, a determination is made whether the status is set to pending step 296. If it is, processing continues on to the next sequence step 298. If the status is not set to pending, processing continues at the statement pointer location, step 300.

This processing according to the logic structure heretofore delineated may be accomplished using an ADA program.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A method for automatically evaluating a decisional rule containing a task and a condition which must be fulfilled before the task can be performed and for automatically performing the task when the condition is fulfilled comprising:

entering said decisional rule into computing means;

compiling said decisional rule to parse said condition;

providing automatic and continuing iterative evaluation of whether said condition is fulfilled until said condition is fulfilled once independent of whether data affecting said condition changes;

automatically performing said task when said condition is fulfilled once; and resuming further processing only after said condition is fulfilled once.

2. A method for automatically executing a decisional rule containing a task and a condition which must be fulfilled before the task can be performed and for automatically performing the task whenever the condition is fulfilled comprising:

entering said decisional rule into computing means;

compiling said decisional rule to parse said condition;

providing automatic and continuing iterative evaluations of whether said condition is fulfilled independent of whether data affecting said condition changes;

automatically performing said task whenever said condition is fulfilled; and resuming further processing each time said condition is fulfilled.

3. A method for automatically executing a decisional rule containing a task and a condition containing a period of time which must be satisfied before the task can be performed and automatically performing the task every time the condition is fulfilled comprising:

entering said decisional rule into computing means;

compiling said decisional rule to parse said condition;

providing automatic and continuing iterative evaluations of whether said condition is fulfilled independent of whether data affecting said condition changes;

automatically performing said task every time said time period is satisfied; and resuming processing each time said task is performed.

4. A method for automatically executing a decisional rule containing a task and a condition which must be fulfilled before the task can be performed and for automatically performing the task whenever the condition is fulfilled comprising:

entering said decisional rule into computing means;

compiling said decisional rule to parse said condition;

providing automatic and continuing iterative evaluations of whether said condition is fulfilled independent of whether data affecting said condition changes;

determining whether the status of said condition has changed between each said iterative evaluation;

automatically performing said task whenever both said condition is fulfilled and said status has changed; and resuming processing each time both said condition is fulfilled and the status of said condition has changed.

5. A system for automatically evaluating a decisional rule containing a task and a condition which must be fulfilled before the task can be performed and automatically performing the task when the condition is fulfilled comprising:

computing means including compiler means and executor means responsive to said compiler means; and means for entering one or more said decisional rules into said computing means, said decisional rule containing a condition and a task to be performed when said condition is fulfilled, said compiler means including parsing means for isolating said condition and further including means for determining whether evaluations of said condition are to continue after said condition is fulfilled once;

said executor means including means for providing automatic and continuing iterative evaluations of whether said condition is fulfilled independent of whether data affecting said condition changes.

6. The system of claim 5 in which said executor means further includes means for performing said task when said condition is fulfilled.

7. The system of claim 5 in which said executor means further includes means for performing said task whenever said condition is fulfilled.

8. The system of claim 5 in which said executor means further includes means to assess, for each iterative evaluation of said condition, whether said condition has changed from a status of fulfilled to not fulfilled.

9. The system of claim 8 in which said executor means further includes means for performing said task whenever both said condition is fulfilled and said condition has changed.

10. A method for automatically evaluating a decisional rule containing a task and a condition which must be fulfilled before the task can be performed and for automatically performing the task when the condition is fulfilled comprising:

combining sequences of statements including decisional rules into bundles;

entering said bundles into computing means;

compiling each said decisional rule to parse said conditions to determine for each decisional rule whether evaluations of said decisional rule are to continue after said condition associated with each said rule is fulfilled once; and providing automatic and continuing iterative evaluations of whether said conditions are fulfilled independent of whether data affecting said condition changes.

11. The method of claim 10 further including processing each said sequence in parallel.

12. The method of claim 11 further including processing said statements of each said sequence serially.

13. The method of claim 12 further including halting processing of said statements upon the occurrence of a decisional rule.

14. The method of claim 13 in which said iterative evaluations continue only until said condition associated with said decisional rule is fulfilled once and in which processing is resumed after said condition is fulfilled once.

15. The method of claim 13 in which said processing is resumed every time said condition is fulfilled.

16. A method for automatically processing a series of statements including commands which automatically halt further processing until a condition associated with each command is fulfilled comprising:

entering a sequence of when/then statements including one or more control commends each containing a condition into processing means;

processing each statement sequentially in said sequence;

halting processing of said statements upon the occurrence of a said control command;

automatically and continuously providing iterative evaluations of whether said condition associated with said control is fulfilled independent of whether data affecting said condition changes; and resuming processing of the remainder of said statements in said sequence only upon the fulfillment of said condition associated with said control command.

17. The method of claim 16 further including determining whether iterative evaluations of said condition associated with each said control command are to continue after the remainder of said statements are processed.

18. A system for automatically processing a series of statements including commands which automatically halt further processing until a condition associated with each command is fulfilled comprising:

input means for entry of a sequence of statements including one or more control commands each containing a condition;

compiler means, responsive to said input means, for recognizing the input of said control commands;

processor means, responsive to said compiler, for sequentially processing each said statement;

means, responsive to said compiler means and said processor means, for halting processing of said statements upon the occurrence of a said command;

means for providing automatic and continuous iterative evaluations of whether said condition associated with said control command is fulfilled independent of whether data affecting said condition changes; and means to resume processing of the remainder of said statements in said sequence only upon the fulfillment of said condition associated with said control command.

19. The system of claim 18 in which said compiler means further include means for determining whether iterative evaluations of said condition associated with each said control command are to continue after processing of the remainder of said statements in said sequence resumes.

20. A system including means for executing a decisional rule which performs a task upon the fulfillment of a condition, the system providing automatic and continuous iterative evaluations of whether a condition is fulfilled until the condition is fulfilled at least once, and which performs the iterative evaluation independent of whether data affecting the condition changes, and which resumes any further processing only after the condition is fulfilled once, which automatically programs the system in order to achieve continuing recursive evaluation of the conditions contained within said decisional rule.

21. A system including means for executing a decisional rule which performs a task upon the fulfillment of a condition, the system providing automatic and continuous iterative evaluations of whether the condition is fulfilled until the condition is fulfilled at least once and which resumes any further processing only after the condition is fulfilled once; and means for automatically iteratively evaluating whether the condition of said decisional rule is fulfilled independent of whether data affecting the condition changes thereby eliminating the need for manually providing additional decisional rules which force sequential evaluation in programming loops.

22. A method for automatically executing a manually entered decisional rule containing a task and a condition which must be fulfilled before the task can be performed and for automatically performing the task whenever the condition is fulfilled comprising:

automatically compiling said decisional rule to parse said condition;

automatically providing computer instructions which accomplish automatic and continuous iterative evaluations of whether said condition is fulfilled independent of whether data affecting the condition changes;

automatically performing said task whenever said condition is fulfilled; and resuming further processing each time said condition is fulfilled.

23. A method for automatically executing a decisional rule containing a task and a condition which must be fulfilled before the task can be performed and for automatically performing the task whenever the condition is fulfilled comprising:

manually entering said decisional rule into computing means;

said computing means automatically compiling said decisional rule to parse said condition, automatically providing instructions which accomplish automatic and continuous iterative evaluations of whether said condition is fulfilled independent of whether data affecting the condition changes and, automatically performing said task whenever said condition is fulfilled and resuming further processing each time said condition is fulfilled.

24. A system for automatically evaluating a decisional rule containing a task and a condition which must be fulfilled before the task can be performed and automatically performing the task when the condition is fulfilled comprising:

computing means including compiler means and executor means responsive to said compiler means; and means for manually entering said decisional rule into said computing means, said decisional rule containing a condition and a task to be performed when said condition is fulfilled once; and wherein said compiler means includes parsing means for isolating said condition and further includes means for determining whether evaluation of said condition are to continue after said condition is fulfilled once; and wherein said executor means includes means for providing automatically and continuing iterative evaluations of whether said condition is fulfilled independent of whether data affecting said condition changes.

25. A method for automatically processing a series of WHEN/THEN statements including control commands which automatically halt further processing until a condition associates with each control command is fulfilled comprising:

manually entering a sequence of WHEN/THEN statements including one or more control commands each containing a condition into processing means;

wherein said processing means automatically processes each statement sequentially in said sequence, automatically halts processing of said statements upon the occurrence of one of said control commands, automatically and continuously provides iterative evaluation of whether said condition associated with said control command is fulfilled, and automatically resumes processing of the remainder of said statement in said sequence only upon the fulfillment of said condition associated with said control command.

\* \* \* \* \*